US008825636B2

(12) United States Patent
Mach

(10) Patent No.: US 8,825,636 B2
(45) Date of Patent: Sep. 2, 2014

(54) SEARCH RESULTS OUTPUT TOOL

(75) Inventor: Kimberly D. Mach, North Bend, WA (US)

(73) Assignee: The Boeing Company, Chicago, IL (US)

( * ) Notice: Subject to any disclaimer, the term of this patent is extended or adjusted under 35 U.S.C. 154(b) by 875 days.

(21) Appl. No.: 12/415,750

(22) Filed: Mar. 31, 2009

(65) Prior Publication Data
US 2010/0250521 A1    Sep. 30, 2010

(51) Int. Cl.
G06F 17/30    (2006.01)

(52) U.S. Cl.
CPC ............................. *G06F 17/30899* (2013.01)
USPC ........................................................ 707/722

(58) Field of Classification Search
USPC ........................................................ 707/705
See application file for complete search history.

(56) References Cited

U.S. PATENT DOCUMENTS

| | | | |
|---|---|---|---|
| 6,038,668 A | 3/2000 | Chipman et al. | |
| 6,523,021 B1 * | 2/2003 | Monberg et al. ...................... | 1/1 |
| 2005/0289106 A1 | 12/2005 | Petri et al. | |
| 2006/0004716 A1 | 1/2006 | Hurst-Hiller et al. | |
| 2006/0271524 A1 | 11/2006 | Tanne et al. | |
| 2007/0266342 A1 | 11/2007 | Chang et al. | |
| 2008/0005064 A1 | 1/2008 | Sarukkai | |
| 2008/0034381 A1 | 2/2008 | Jalon et al. | |
| 2008/0214156 A1 | 9/2008 | Ramer et al. | |
| 2008/0222131 A1 | 9/2008 | Wang | |
| 2008/0228821 A1 * | 9/2008 | Mick et al. ................. | 707/104.1 |
| 2008/0295007 A1 * | 11/2008 | Bernhardt ..................... | 715/764 |
| 2009/0249248 A1 | 10/2009 | Burckart et al. | |
| 2010/0082610 A1 | 4/2010 | Anick et al. | |

* cited by examiner

*Primary Examiner* — Syed Hasan
(74) *Attorney, Agent, or Firm* — Toler Law Group, PC

(57) ABSTRACT

Methods, systems, and computer-readable storage media are disclosed for providing a search results output tool. According to an illustrative embodiment, a method receives one or more search results generated by a search engine in response to a user query of a network information source. Each of the search results is associated with one or more properties. The properties associated with each of the search results are stored. The user is prompted to select one or more selected search results. The user is also prompted to select one or more selected properties. A record is generated for each of the selected search results that include the one or more selected properties. The record for each of the selected search results is then output.

18 Claims, 15 Drawing Sheets

SEARCH RESULTS OUTPUT TOOL

FIELD OF THE DISCLOSURE

The present disclosure is generally related to selectively reducing output of search results.

BACKGROUND

The Internet, enterprise intranets, and other online databases or other network information sources make vast amounts of searchable information available to users. For example, by using a search engine to perform a query or a search of the Internet about a given topic, a user may retrieve links to many web pages that, if printed, would amount to reams of printed information on the given topic. Similarly, by performing a search regarding a product or service produced by an enterprise on an enterprise intranet or database, a user may identify myriad documents that pertain to the product or service at issue.

After completing a search, a user may wish to save the results. Unfortunately, the user's ability to preserve the results of the search is limited. The user can print a list of results produced by the search engine using the print capabilities of a browser. However, the printed list may only include results from a single page of results, and printing the page of results may result in printing undesired content, such as irrelevant or undesired search results, sponsored links or other advertisements presented with the list of results, etc. The printed list of results also may only include a link to a desired result, without providing other details about the result the user may elect to save.

Alternatively, the user may print out the pages for the results of interest. However, the pages may contain advertisements or other extraneous content that the user does not want since the user may only want a small portion of the content displayed by the page. Also, the user may have to individually access each of the results of interest and individually print those pages to save the information of interest.

In printing lists of search results or pages from the results themselves, the user may have to print many pages of content to secure information included in only a small portion of the printed pages. Thus, saving the results of interest not only may be a tedious process in paging through and printing results of interest, but printing the results may waste a great deal of paper, toner, printer time, and other related printing resources. Correspondingly, if the results are stored rather than printed, the results may consume an unnecessarily large share of storage resources as well as network resources and other resources used in storing the results.

SUMMARY

Embodiments disclosed herein include methods, systems, and computer-readable media for outputting records including one or more selected properties of each of one or more selected search results. Upon retrieving one or more search results, one or more properties of each of the one or more search results, such as a title, uniform resource locator (URL), a date, a model number, etc., are stored in a dictionary. A user is prompted to select one or more of the search results. The user is also prompted to select one or more of the properties associated with the one or more search results. A record, such as a text block, is generated for each of the selected search results where the record for each of the search results includes the selected properties. Thus, a user is able to save the results of a search without having to save or print extraneous material and without having to individually access each of the search results to save or print the content of each of the search results.

In one illustrative embodiment, a method receives one or more search results generated by a search engine in response to a user query of a network information source. Each of the one or more search results is associated with one or more properties. The one or more properties associated with each of the search results are stored. The user is prompted to select one or more selected search results from the one or more search results. The user is also prompted to select one or more selected properties. A record is generated for each of the one or more selected search results where the record includes the one or more selected properties. The record for each of the one or more selected search results is then output.

In another illustrative embodiment, a search results output system generates text blocks including one or more selected properties associated with each of one or more selected search results generated by a search engine in response to a query. A results interface is configured to receive one or more search results generated by a search engine in response to a query, where each of the search results is associated with one or more properties. A data store is configured to store the properties associated with each of the search results. An input interface configured to receive a user selection of one or more selected search results from among the one or more search results and one or more selected properties from among the one or more properties. An output interface is configured to print a plurality of text blocks. Each of the text blocks includes the one or more selected properties a corresponding selected search result.

In yet another illustrative embodiment, a computer-readable storage medium stores instructions executable by a computing system. One or more search results generated by a search engine are received in response to a user query of a networked source of information. Each of the search results is associated with one or more properties. The search results are displayed to the user. The one or more properties are stored in a dictionary. The user is prompted to select one or more selected search results from among the search results to be printed. A selection of the selected search results is received. The user is prompted to select one or more selected properties associated with the search results to be printed. A selection of the selected properties is received. The selected properties are retrieved from the dictionary. Text blocks including the selected properties for the selected search results are generated. The text blocks are output.

The features, functions, and advantages that have been described can be achieved independently in various embodiments or may be combined in yet other embodiments, further details of which are disclosed with reference to the following description and drawings.

DETAILED DESCRIPTION

In accordance with particular illustrative embodiments, a search results output tool is configured to print, store, or otherwise output records identified by one or more selected properties of each of one or more selected search results. Upon retrieving one or more search results, such as by using a search engine, one or more properties of each of the search results are stored in a dictionary. A user is prompted to select one or more of the search results and one or more of the properties associated with the search results. A record, such as a text block, is generated for each of the selected search results where the record for each of the search results includes the selected properties. Thus, a user is able to save or print the results of a search without having to save or print extraneous material and without having to individually access each of the search results to save or print the content of each of the search results.

Figure 1:
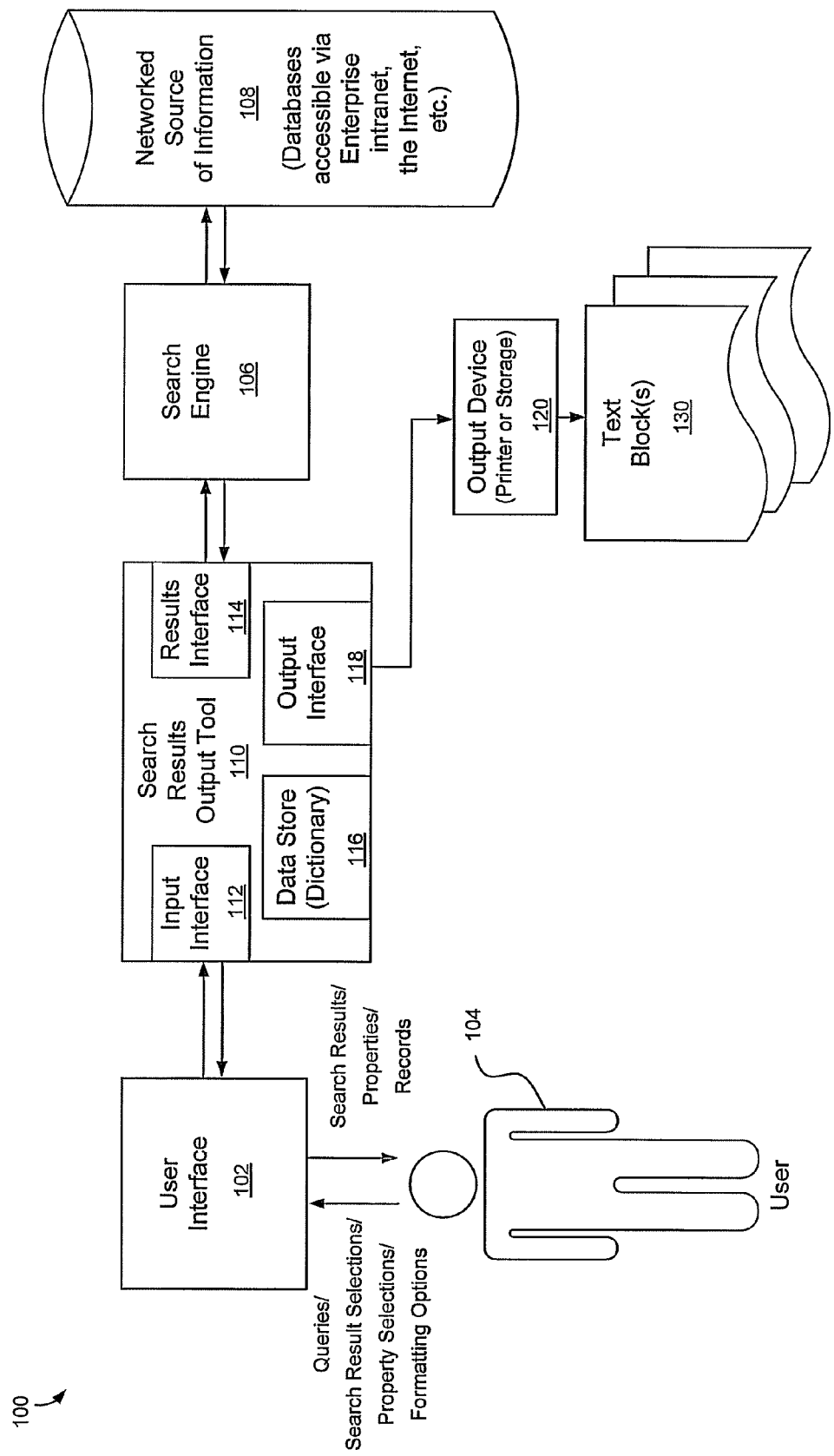
FIG. 1 is a block diagram of a particular illustrative embodiment of a search results output tool for generating text blocks including one or more selected properties associated with each of one or more selected search results.

FIG. 1 is a block diagram depicting a particular illustrative embodiment of a system, generally designated 100, including a search results output tool for generating text blocks 130 based on one or more selected properties associated with each of one or more selected search results. The system 100 includes a user interface 102 through which a user 104 engages the system 100. The system 100 also includes the search results output tool 110 that engages the user interface 102, a search engine 106, and an output device 120. The search engine 106 accesses a networked source of information 108 to perform one or more searches. The networked source of information may include a database that may be accessed through an enterprise intranet, through the Internet, or through some other communications system. The output device 120 may include a printer to generate printed records of search results, such as the text blocks 130, or a storage device to store records of portions of search results generated in accordance with embodiments of the present disclosure.

The user interface 102 enables the user 104 to submit queries, to review search results, and, in accordance with particular illustrative embodiments of the system 100, to select search results and properties to be included in records generated for selected search results, and to review records and change formatting options for the records, as further described below.

The search results output tool 110 includes an input interface 112 that supports the user interface 102. After presenting user queries to the search engine 106 and receiving search results from the search engine 106 via a results interface 114, the search results output tool 110 presents search results to the user 104 via the user interface 102. According to an embodiment further described below, the search results are presented to the user 104 in a selectable form via the user interface 102. Via the input interface 112, the search results output tool 110 also prompts the user 104 to select one or more search results for which records will be generated to be printed, stored, or otherwise output. Also via the input interface 112, the search results output tool 110 prompts the user 104 to select one or more properties to be displayed for the one or more selected search results and enables the user 104 to change the output format of the records of the one or more selected search results.

According to a particular illustrative embodiment, when the search results output tool 110 receives search results of a query from the search engine 106 via the results interface 114, one or more properties associated with each of the search results are stored in a data store 116, such as a dictionary. By storing the properties associated with the one or more search results in the data store 116, when a user selects to print, store, or otherwise output information from one or more selected search results, the selected properties for each of the selected search results may be retrieved from the dictionary or other data store 116. By maintaining the properties in the dictionary or other data store 116, the search results output tool 110 may avoid having to again access the search engine 106 or the networked source of information 108 to retrieve the selected properties for the selected search results, thereby saving time and resources of the search engine 106 and the networked source of information 108.

Once the user 104 has selected one or more selected properties for one or more selected search results to be output, an output interface 118 generates the output. The output may be in the form of records that, in turn, may be in the form of text blocks 130 as further described below. The output may be directed by the output interface 118 to the output device 120. When the output device 120 is a printer, the output will be in the form of printed output where the records presenting the selected properties for the selected search results are presented as printed text blocks 130. Alternatively, the output device 120 may be a storage device, such as a magnetic or optical disk or a FLASH memory, and the output may be in the form of storage records or a formatted file, such as a portable document format (.pdf) file, a text (.txt) file, or Microsoft Word document (.doc) file.

Regardless of the form of the output, the search results and output tool 110 enables the user 104 to save selected results of a query without printing or saving every web page or other document found or having to print lists including every search result found when the user 104 is only interested in a few selected search results. Moreover, the user 104 can print or save only the portions of each of the selected search results that are of interest without printing or saving banner advertisements or other extraneous material that may originally appear in the search results.

Figure 2:
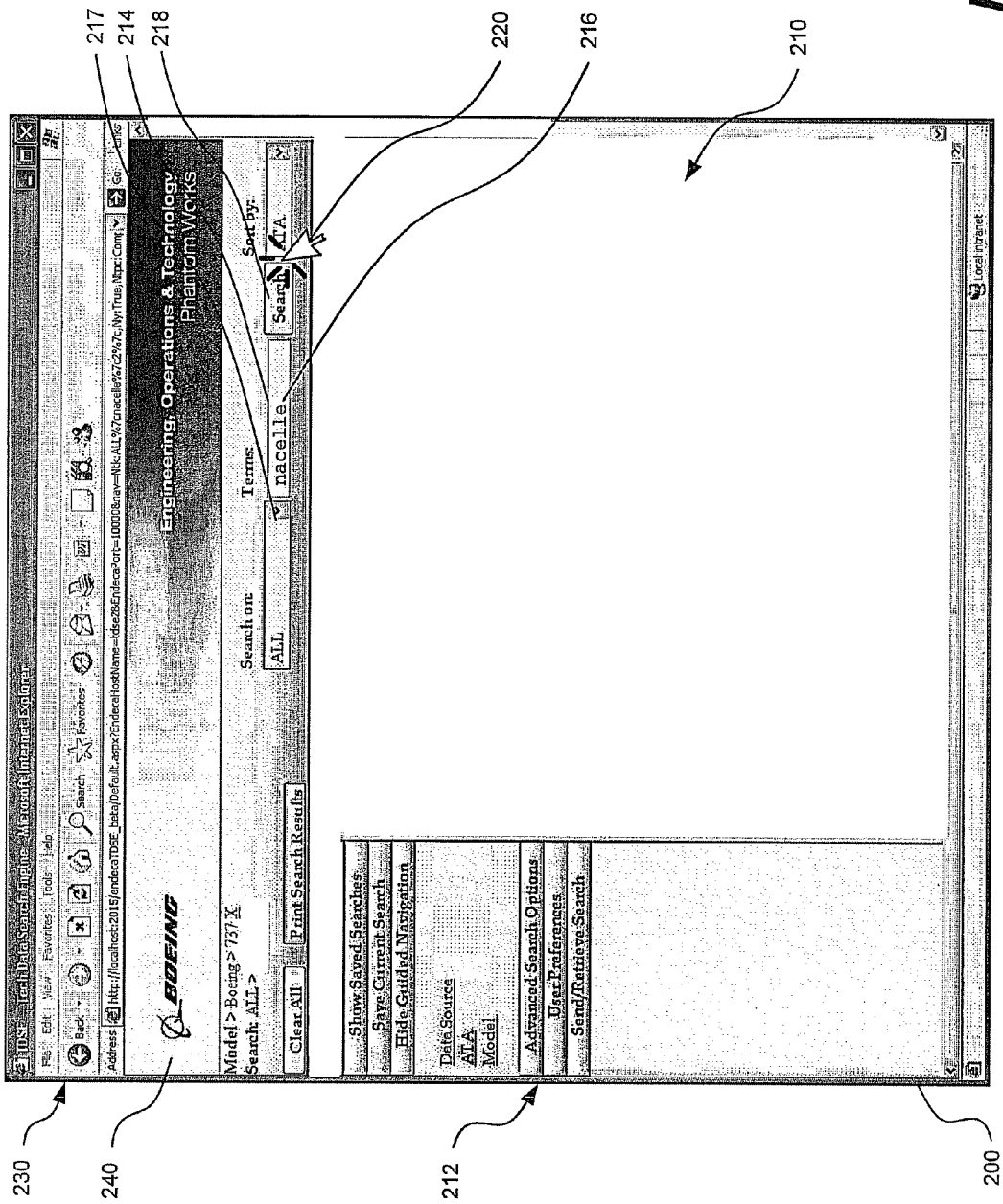
FIG. 2 depicts a user interface of a search engine that a user may employ to submit a query to a system.

FIG. 2 depicts a user interface 200 of a search engine that a user may employ to submit a query to a system, such as to the system 100. The user interface 200 represents an interface to an enterprise search engine that may be used to search one or more selected databases for enterprise documents, such as technical documentation or maintenance documentation for a plurality of objects developed, manufactured, marketed, serviced, maintained, or otherwise of interest to the enterprise. In an enterprise search, the search may be performed via an enterprise intranet or other enterprise networking system. The one or more properties associated with each of the objects presented in the search results may include one or more categories selected by the enterprise. For example, the enterprise may select industry classification codes or enterprise-specific titles or product identifiers as properties to be associated with each of the search results. However, embodiments of the present disclosure may be used with search engines configured to access the Internet or any other type of network.

A results window 210 is provided in which search results generated in response to a query may be displayed. The user interface 200 for the search engine may include a variety of search options 212 that a user may select to tailor the search engine to the user's preferences. The user interface 200 also includes a search input field 214 where the user may enter one or more terms on which to perform a search. In the example of FIG. 2, the user enters the term "nacelle" 216 in the search input field. The user interface 200 may include a search restriction control 217 that enables the user to restrict the search on the specified search terms to a particular database, document set, or other specified information source. The user may execute the search by selecting a search button 218, such as by manipulating a pointing device (not shown) to select the search button 218.

The search engine may be accessed using a browser application 230. The browser application 230 may include a print function configured to print the contents of pages displayed by the browser application 230. However, as previously described, such pages may include content, such as a banner 240, that the user may not want to print or that may be wasteful to print.

Figure 3:
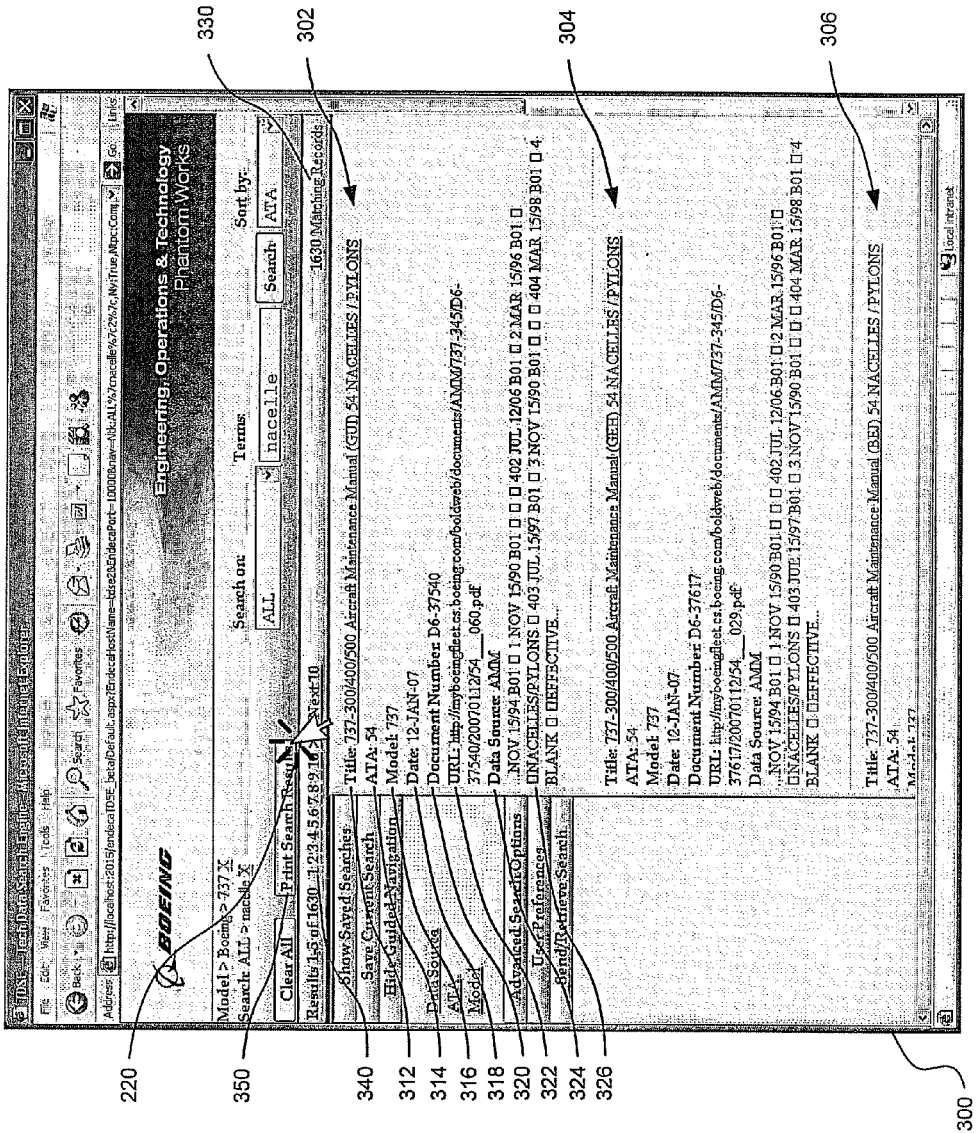
FIG. 3 depicts a user interface displaying a plurality of search results generated in response to the query of FIG. 2.

FIG. 3 depicts a user interface 300 displaying a plurality of search results 302-306 generated in response to the query of FIG. 2. Each of the search results includes a number of entries or properties 312-326. For example, a first search result 302 includes a title 312, an air transport association (ATA) classification code 314, a model number 316, and a date 318 that is associated with the first search result 302. The first search result 302 also includes a document number 320, a uniform resource locator (URL) 322, a data source 324 for the first search result 302, and a segment 326 of the first search result 302 that the user can use to assess the potential relevance of the first search.

The user interface 300 shows a number of search results 330 that shows that the search results 302-306 are just a few of the "1630" results of the query submitted by the user in FIG. 2. The user interface 300 also shows a page listing 340 listing pages over which the number of search results 330 is distributed. As previously described, using a print function of the browser application 230 (FIG. 2), the user may print pages of lists of search results or could access individual search results and print them. However, the browser application 230 does not provide the capability for the user to identify selected search results from among the search results 302-306 or to identify selected properties from among the properties 312-326 that the user would like to save. However, according to a particular illustrative embodiment using a search results output tool, a user can identify selected search results and selected properties to be saved or output by selecting a print search results function 350, such as by clicking on the print search results 350 button using the cursor 220.

Figure 4:
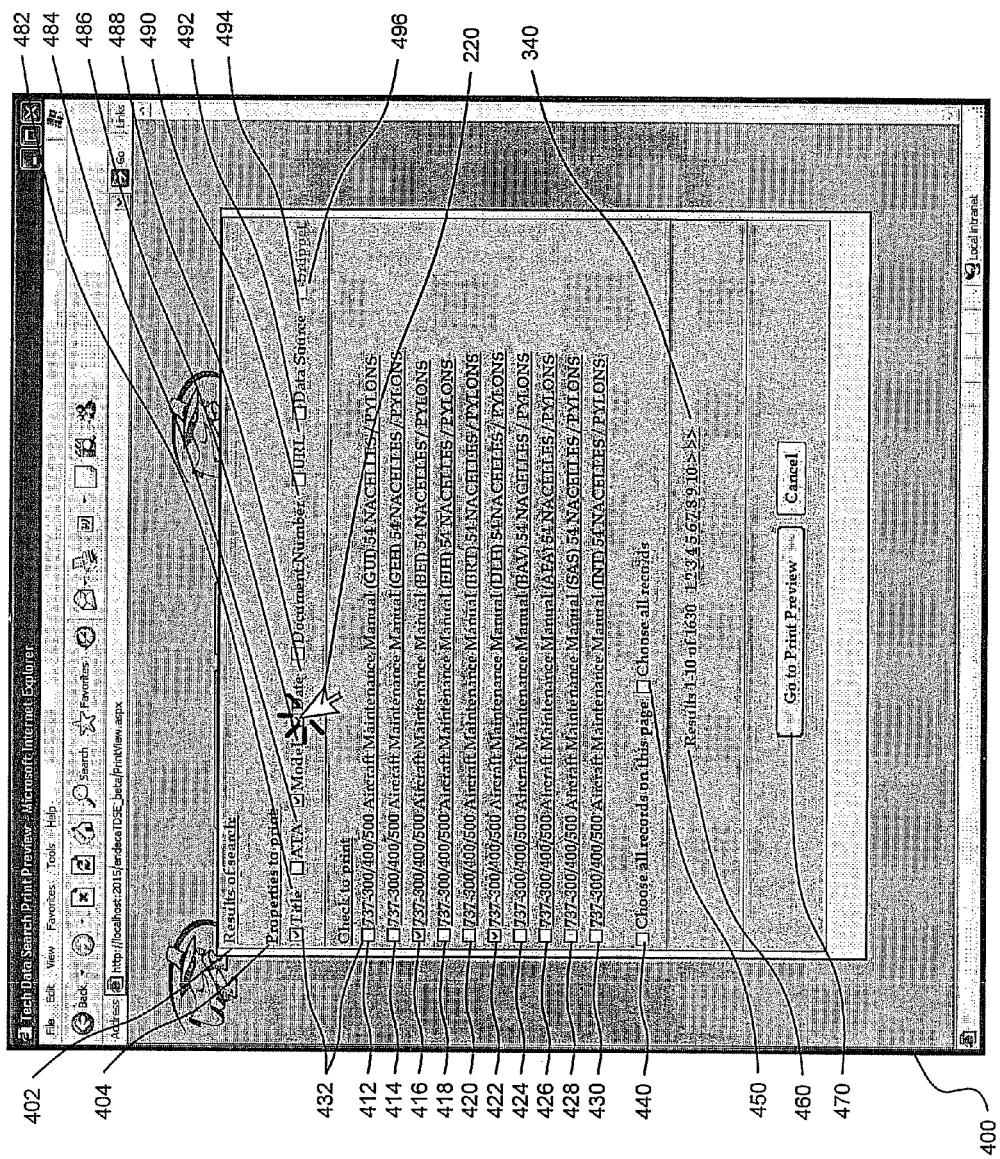
FIG. 4 depicts a user interface generated in response to the user's selection of the print search results function that enables the user to select search results and properties to be saved or printed.

FIG. 4 depicts a user interface 400 generated in response to the user's selection of the print search results function 350 that enables the user to select search results and properties to be saved or printed. The user interface 400 includes a list of results of the search 402 and a list of properties to print 404 from which the user may make desired selections. The list of results of the search 402 includes entries for a plurality of search results 412-430, including entries 412-416 for the search results 302-306 (FIG. 3). Each of the entries 412-430 for the search results, as well as entries for the properties 482-494, includes a selection field 432 that, in FIG. 4, is in the form of a check box that the user can select or deselect by manipulating the cursor 220.

From among the entries 412-430, the user is able to identify selected search results to be printed, saved, or otherwise output. The user may select individual entries from among the entries 412-430 representing the search results, or the user can select an option to select all records on the current page 440 or all records of all the search results 450. As in the case of the user interface 300 (FIG. 3), the user also may navigate between pages of search results using the page listing 340 to select which of the search results the user wishes to select to be output.

In addition to selecting from among the entries 412-430, the user also is able to select which of the properties 482-494 the user wishes to identify to be printed, saved, or otherwise output. The properties 482-494 include many of the same properties as displayed in the user interface 300 (FIG. 3) and specifically include entries for a title 482, an ATA classification code 484, a model number 486, a date 488, a document number 490, a URL 492, and a data source 494. The entries also may include an entry to print a "snippet" 496 including a portion or a summary of the selected search results.

Once the user has selected one or more of the entries representing one or more search results 412-430 or other search results and one or more of the entries representing properties 482-496, the user may select a print preview function 470, such as by manipulating the cursor 220. The print preview function 470 will generate a list of records, which in one embodiment is in the form of text blocks, representing the selected search results and selected properties for the user to preview before printing, saving, or otherwise outputting.

Figure 5:
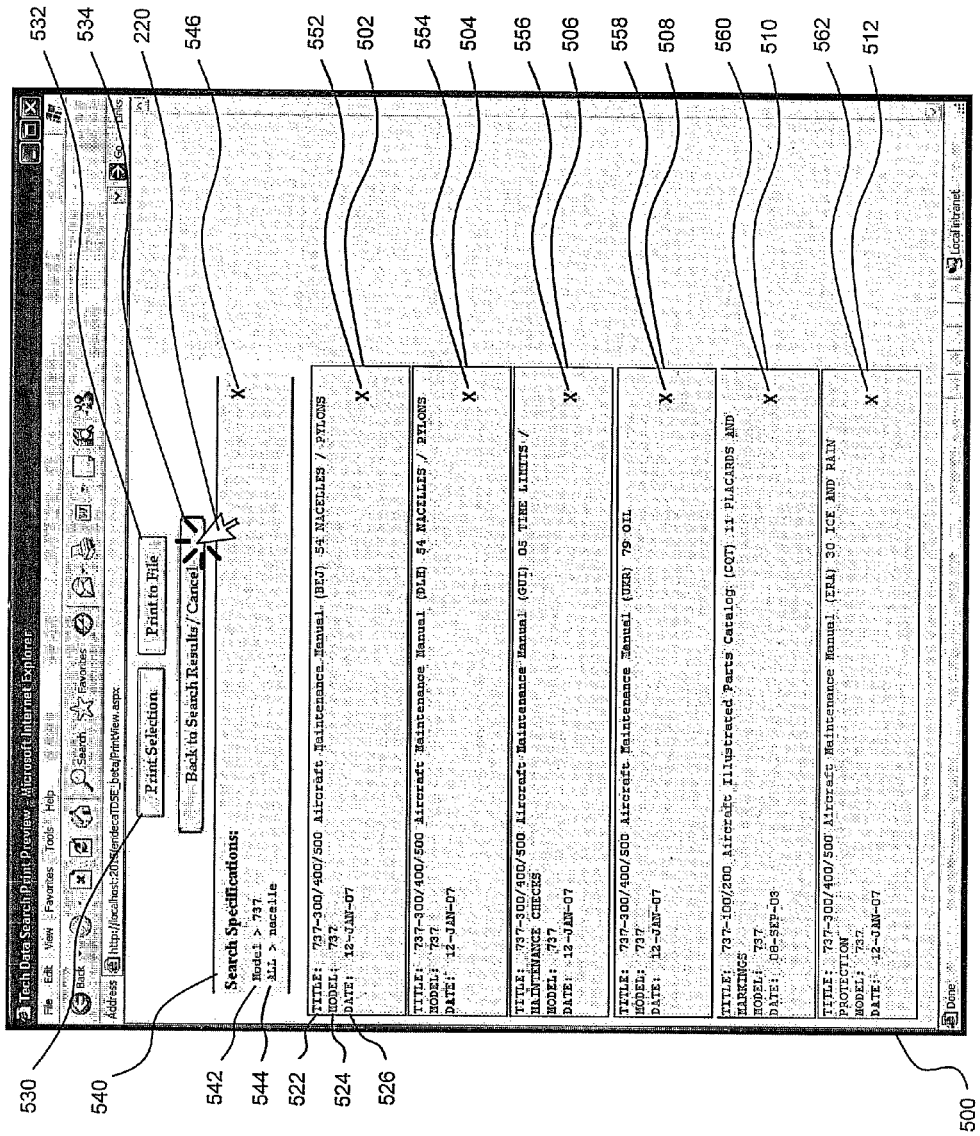
FIG. 5 depicts a user interface showing a preview of text blocks representing records including one or more selected properties for each of one or more selected search results that may be selected by the user from the user interface depicted in FIG. 4.

FIG. 5 depicts a user interface 500 showing a preview of text blocks representing records including one or more selected properties for each of one or more selected search results that might be selected by the user from the user interface depicted in FIG. 4. The user interface 500 includes text blocks 502-512, representing six selected search results (of the "1630" search results indicated as the number of search results 330 in FIG. 3). Moreover, instead of displaying all of the properties associated with the search results represented in the text blocks 502-512, the text blocks list only three selected properties for each of the selected search results: a title 522, a model number 524, and a date 526. Thus, from the numerous search results and many properties that might be listed, the user is able to pare down the desired output to a relatively few text blocks 502-512 representing selected search results and relatively few selected properties 522-526 of interest. In paring down the output, for example, the user may save a great deal of paper, if the user chooses printed output, or the user may save a great deal of storage, if the user chooses to store the output. Each of the text blocks 502-512 includes a remove record option 552-562, respectively, which is shown as a selectable "X" associated with each of the text blocks 502-512 in FIG. 5. As further described below, the remove record option 552-562 may be used to deselect one or more particular search results to remove the records or text blocks representing the one or more particular search results from the list of records.

Upon viewing the user interface 500, the user may select a print selection function 530 to generate printed or other output to save the results of the search. Alternatively, the user may choose a print to file option 532 to store the results of the search in a data file, such as a .pdf file, .txt file, a .doc file, or another form of data file. In addition, the user may choose a back to results or cancel function 540 that, according to a particular illustrative embodiment, returns the user to a selection screen similar to user interface 400 to enable the user to modify the user's selection of search results or properties to be included in the output. According to a particular illustrative embodiment, the user interface 500 presents a search specifications display 540 that displays to the user search specifications the user has chosen for the search, such as a model number 542 and a search indication 544 which, in this example, displays that the user searched on the term "nacelle" 216 (FIG. 2) in all available information sources because the user did not limit the search with the search restriction control 217 (FIG. 2). According to an illustrative embodiment, the user may suppress the search specifications display 540 by selecting a cancel option shown 546 as a selectable "X" in FIG. 5.

Figure 6:
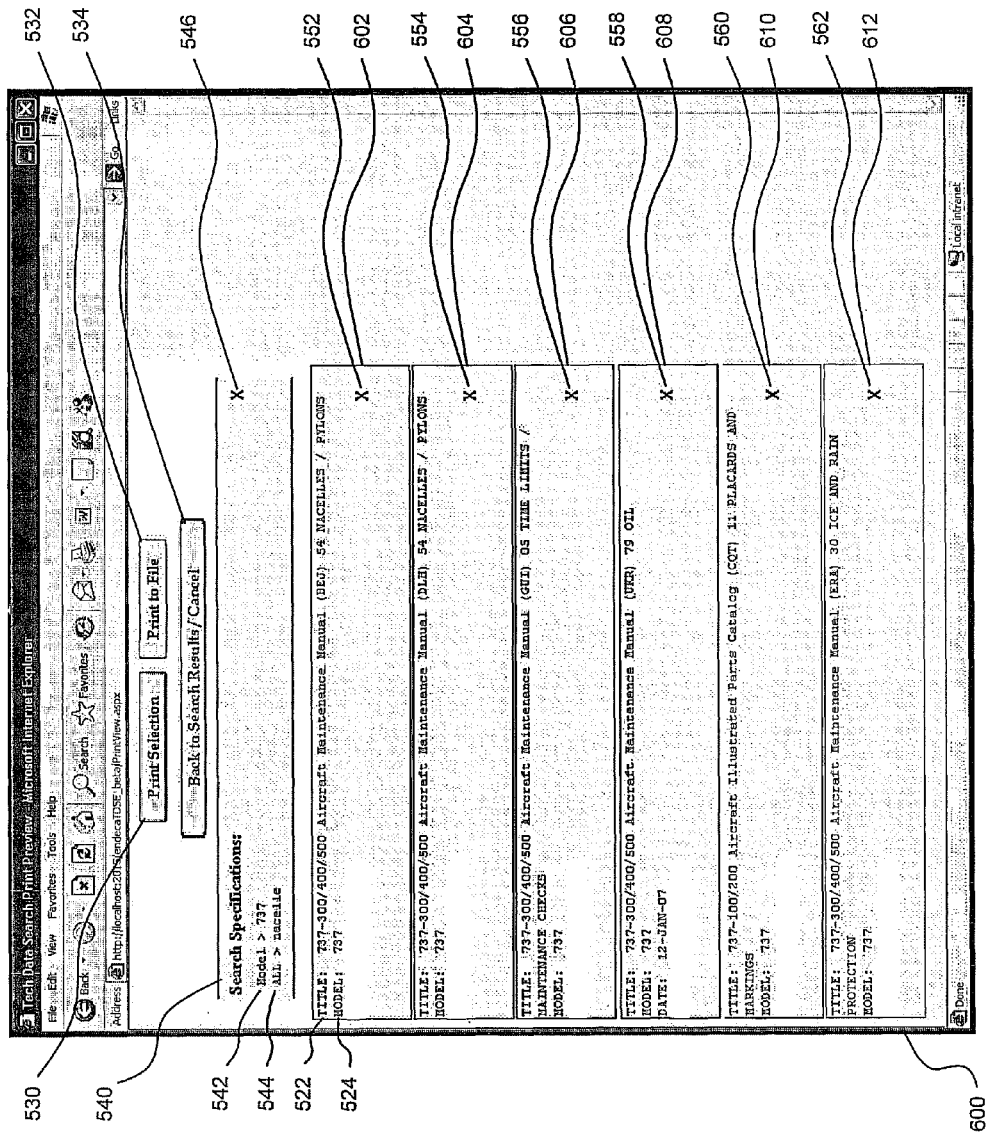
FIG. 6 depicts a user interface displaying modified records when the user has chosen to further modify the list of records represented in the text blocks of FIG. 5.

FIG. 6 depicts a user interface 600 displaying modified records 602-612 when the user has chosen to further modify the list of records represented in the text blocks 502-512 of FIG. 5. According to a particular embodiment, by selecting the back to search results or cancel function 534, the user may return to a selection screen, such as shown in FIG. 4, to deselect one of the previously selected properties. The text blocks 602-612 only include the title 522 and the model number 524 but no longer include the date property 526 (FIG. 5). The removal of the date property 526 (FIG. 5) shows that the user deselected the date property 526 so the date property would no longer be one of the selected properties shown in the records 602-612. If the user is satisfied with the list of records as it now appears, the user may select the print selection function 530 to print the selected results, the user may select the print to file option 532 to store the results of the search, or the user may select the back to search results or cancel function 540 to further modify the selected search results.

Figure 7:
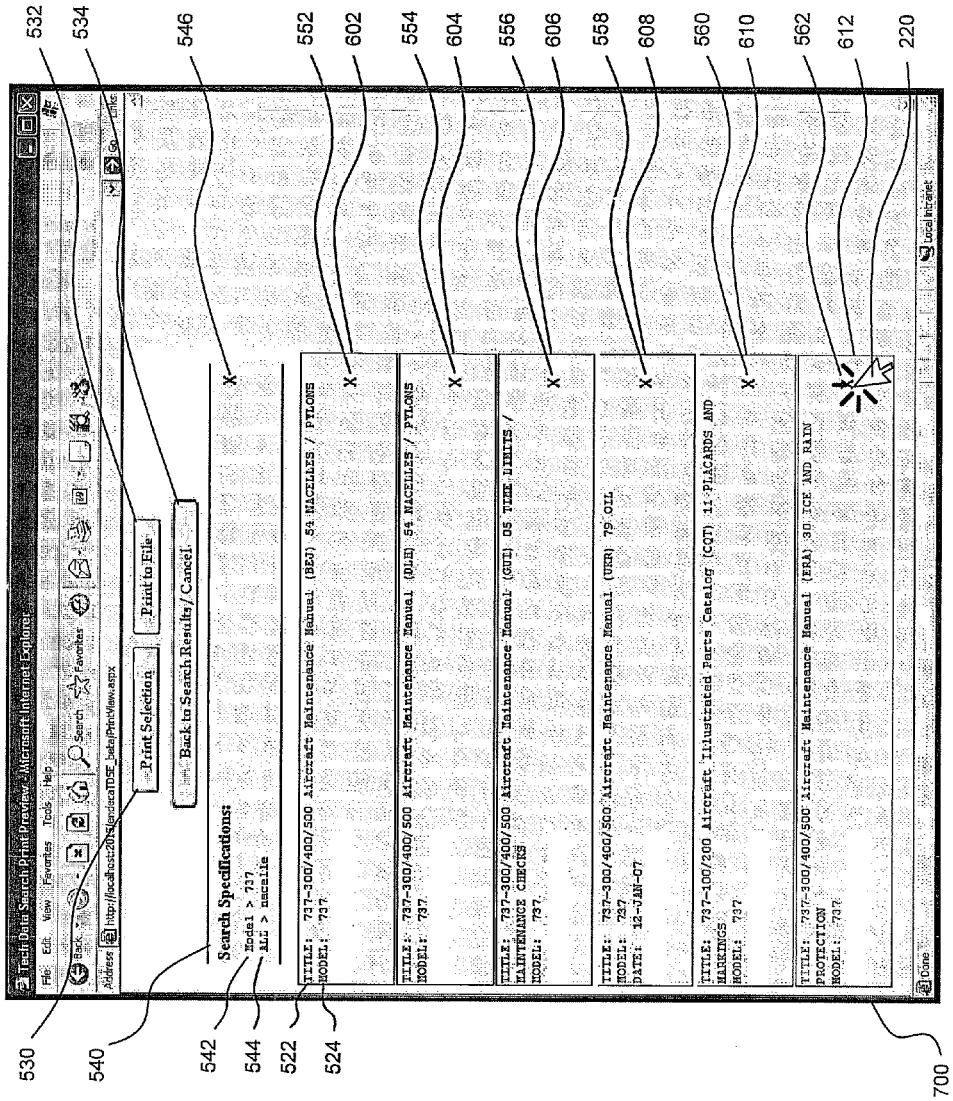
FIG. 7 depicts a user interface listing a subset of the records of FIG. 6 to illustrate how the user may choose to modify the records that appear in a list of records.

FIG. 7 depicts a user interface 700 listing a subset of the records 602-612 of FIG. 6 to illustrate how the user may choose to modify the records that appear in a list of records. As already described with reference to FIG. 6, after previewing the list of originally selected records 502-512 the user may choose the back to results or cancel function 534 to modify the selections the user previously made. Thus, for example, the user may return to the user interface 400 of FIG. 4 and deselect the search result represented by one or more of the records 602-612 by manipulating the selection field 432 (FIG. 4) of the search results to be selected. Then, by selecting the print preview function 470, the user interface 700 will be presented to show the modified list of selected search results including only the records that the user chose to continue to display.

As shown in FIG. 7, the user also may remove a record from the list of records shown by the user interface 700 by selecting the remove record option 552-562 associated with each of the records 602-612, respectively, that the user desires to remove from the list of records. As shown in FIG. 7, the user manipulates a pointing device or other input device (not shown in FIG. 7) to select the remove record option 562 associated with record 612.

Figure 8:
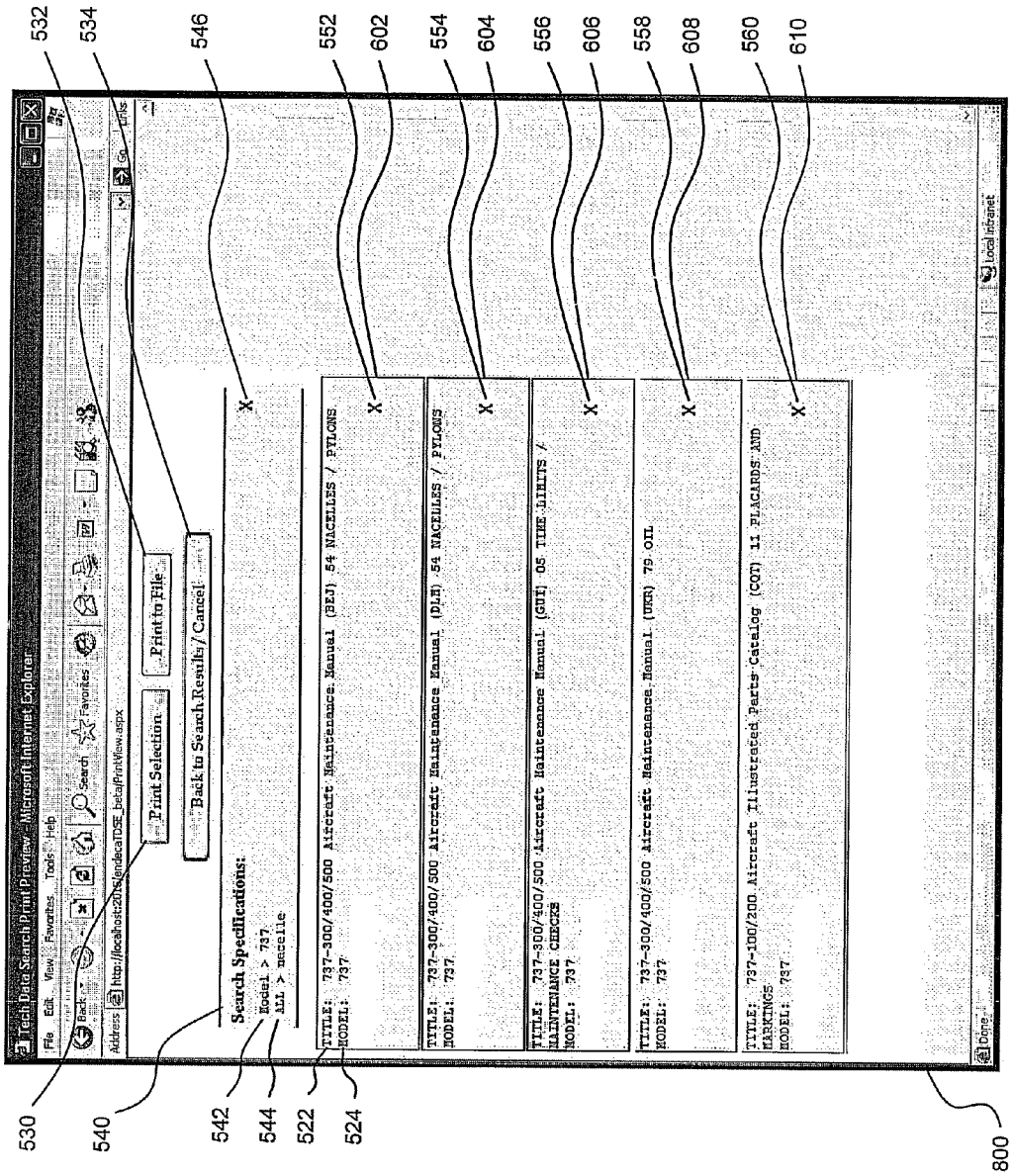
FIG. 8 depicts a user interface showing a modified list of records including records in response to the user's selection depicted in FIG. 7.

FIG. 8 depicts a user interface 800 showing a modified list of records including records 602-610 in response to the user's selection depicted in FIG. 7. Because the user selected the remove record option 562 associated with the record 612 (FIGS. 6 and 7), the record 612 was deselected and, thus, not included in the modified list of search results of FIG. 8. Similarly, by selecting the remove record option 552-560 associated with other records 602-610, additional records may be removed from the list of records displayed.

Figure 9:
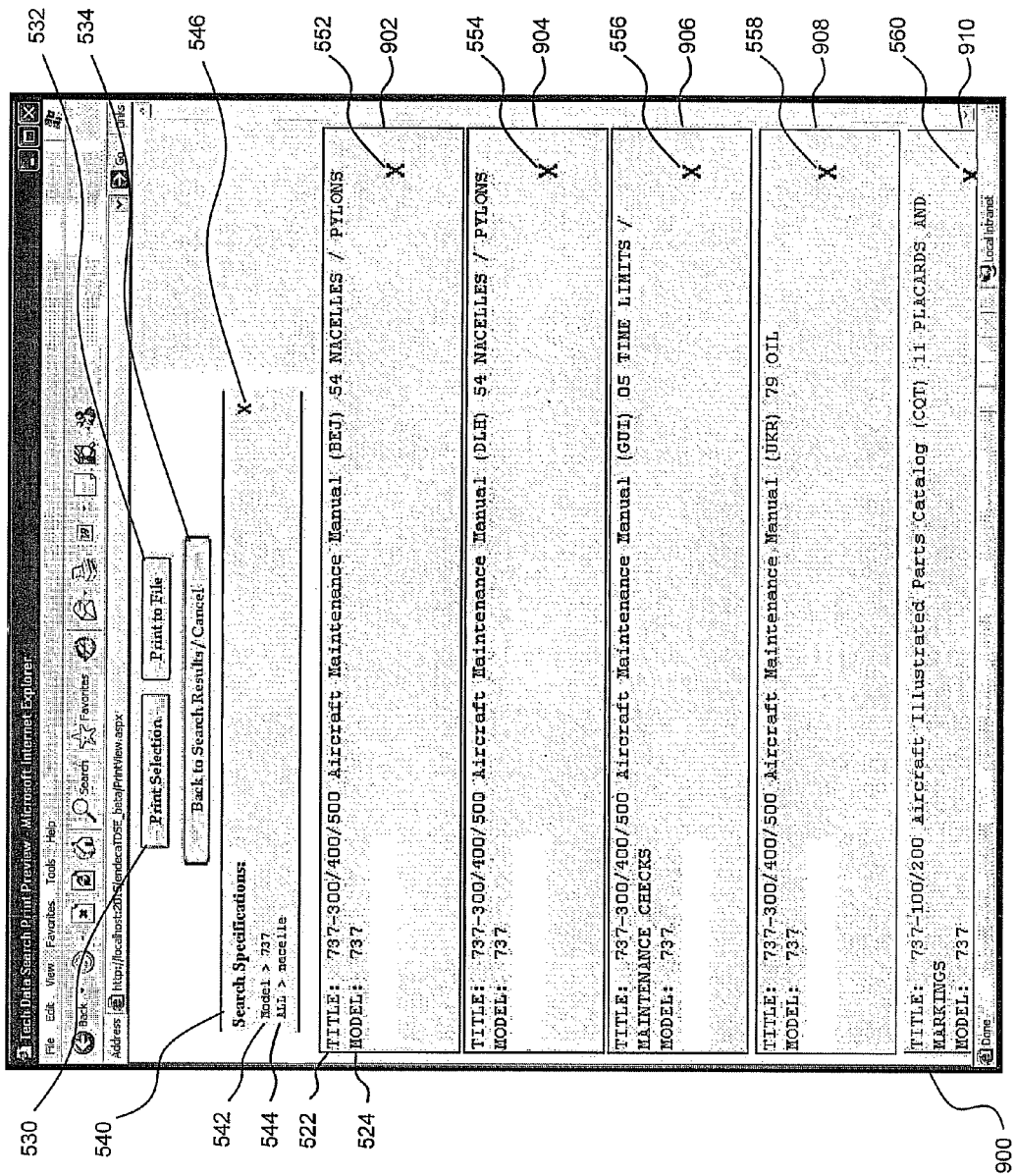
FIG. 9 depicts a user interface of a preview screen of the selected records and selected properties of the user interface depicted in FIG. 8 for which the user has selected to modify formatting options.

FIG. 9 depicts a user interface 900 of a preview screen of the selected records and selected properties of the user interface 800 depicted in FIG. 8 for which the user has selected to modify formatting options. For example, from the same selected records 602-610 and selected properties 522 and 524 of FIG. 8, the user has selected to generate enlarged text blocks 902-910 for printing, saving, or other output. According to other embodiments, a user may change fonts, reduce the size of the text blocks, and make other adjustments to the output.

Figure 10:
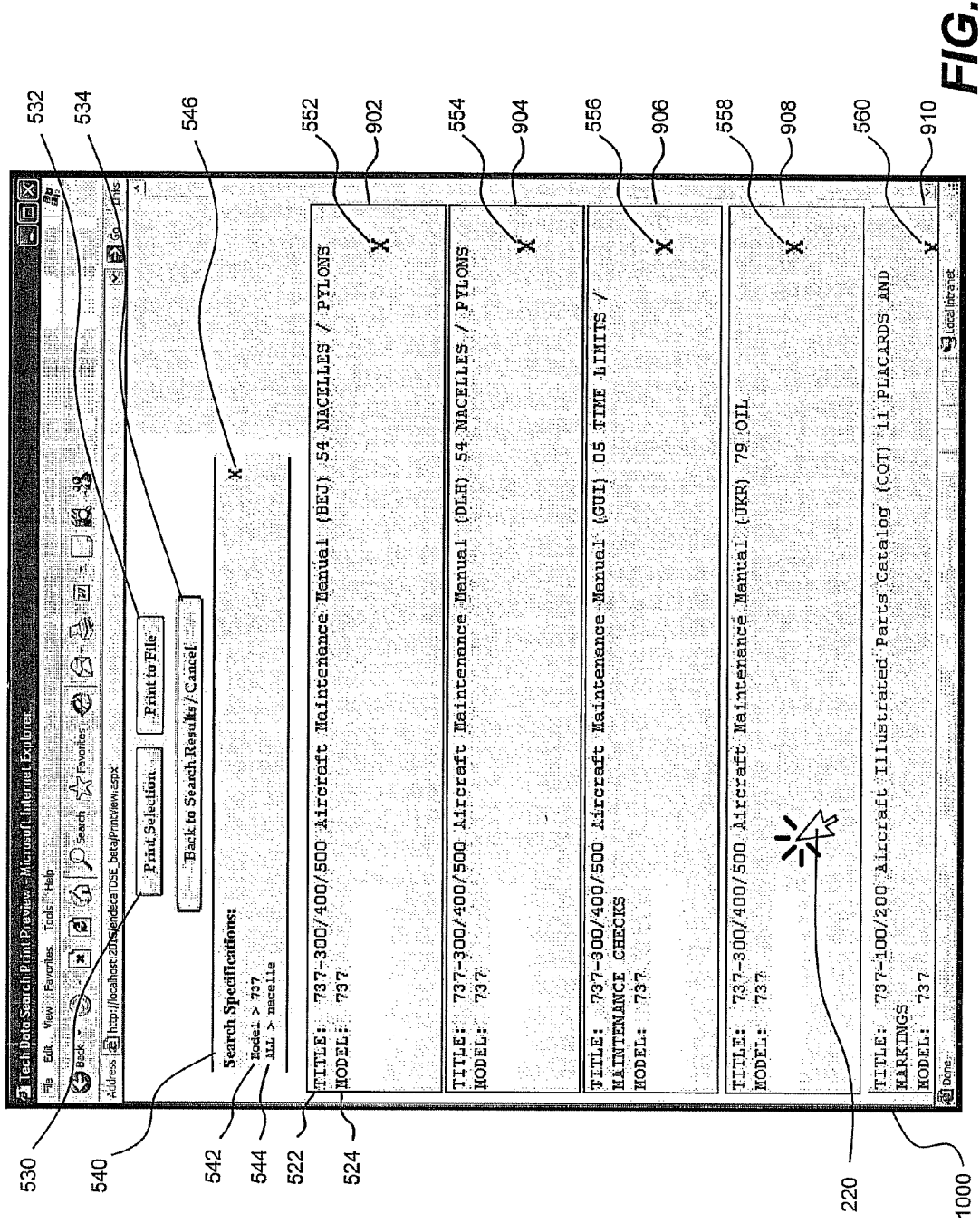
FIG. 10 depicts a user interface of a preview screen of the records of the user interface depicted in FIG. 9 for which the user has selected to move one of the records to change an order in which the records appear in the output that may be printed or saved.

FIG. 10 depicts a user interface 1000 of a preview screen of the records 902-910 of the user interface 900 depicted in FIG. 9 for which the user has selected to move one of the records 902-910 to change an order in which the records 902-910 appear in the output that may be printed or saved. According to a particular illustrative embodiment, the user may move one of the records 902-910 by using "drag and drop." To initiate moving one of the records 902-910, the user may, for example, manipulate a pointing device or other input device (not shown in FIG. 10) to direct a cursor 220 to select a desired record, such as the record 908.

Figure 11:
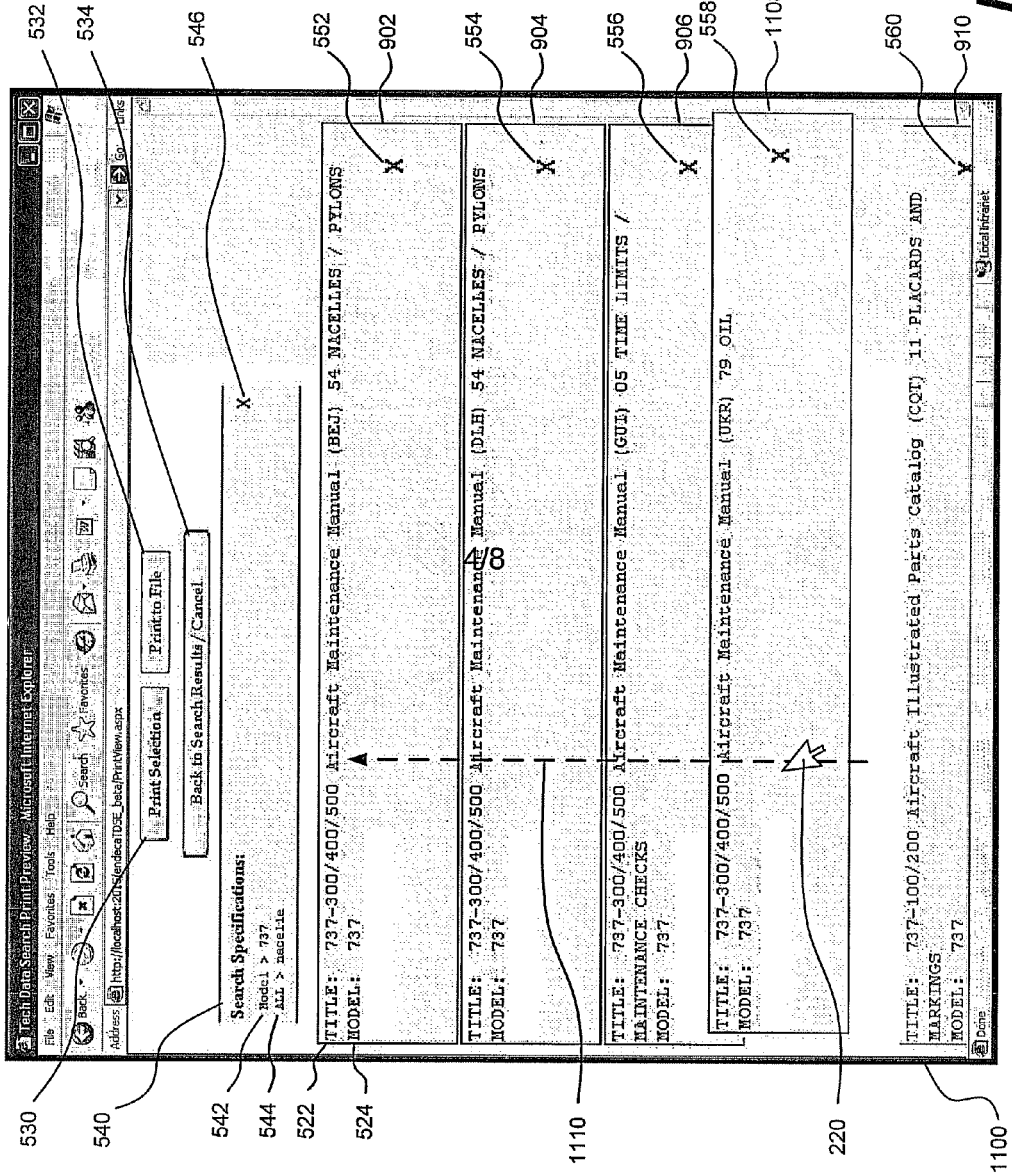
FIG. 11 depicts a user interface of a preview screen of the records in which the user is moving a selected record, as depicted in FIG. 10, to another location among the other records.

FIG. 11 depicts a user interface 1100 of a preview screen of the records 902-910 in which the user is moving a record 1108 that is selected as depicted in FIG. 10 to another location among the other records 902-906 and 910. As shown in FIG. 11, the user may manipulate the pointing device or other input device (not shown in FIG. 11) to drag the selected record 1108 along a path 1110 to position the selected record 1108 first in the list ahead of the other records 902-906 and 910.

Figure 12:
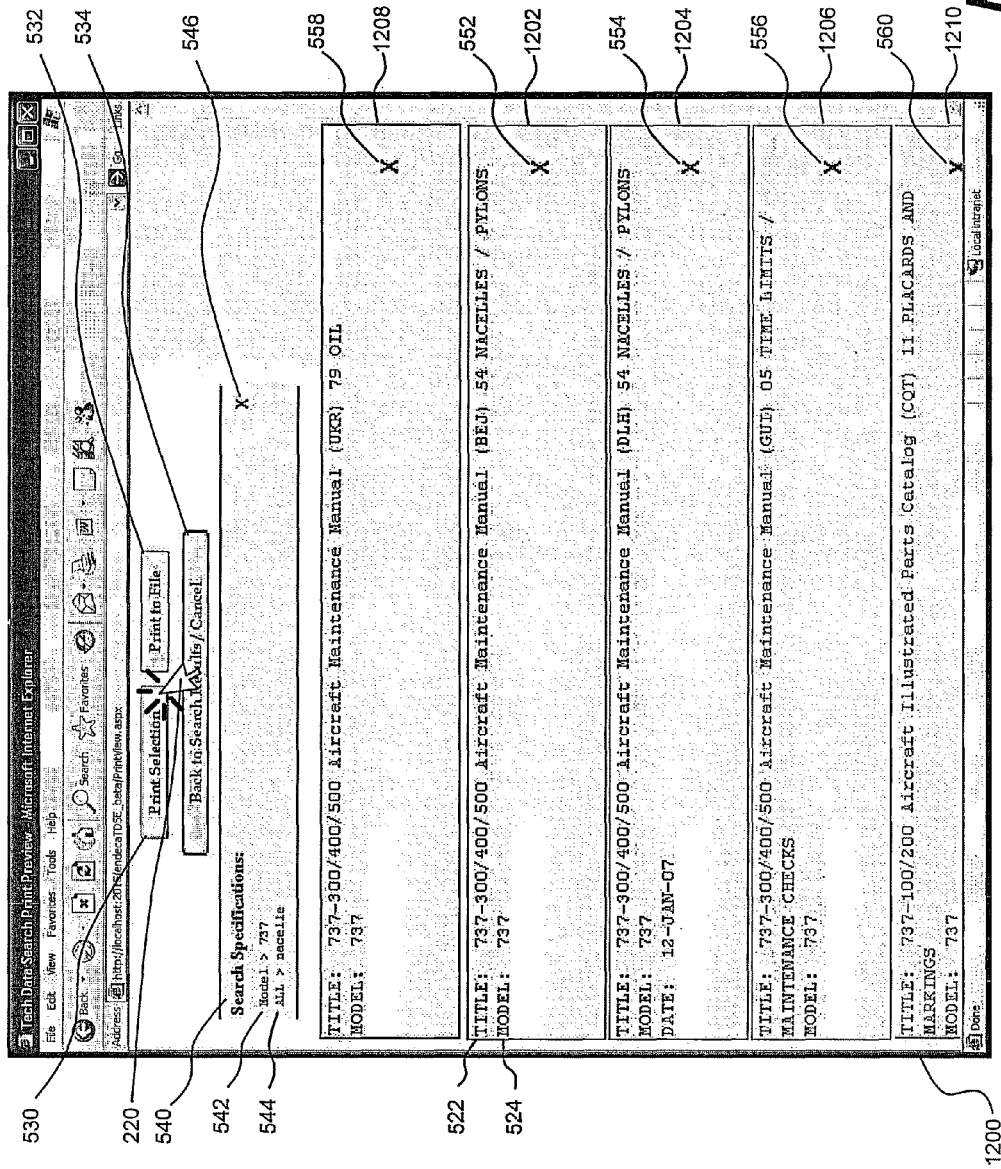
FIG. 12 depicts a user interface of a preview screen of reordered records based on the user's movement of the selected record as depicted in FIG. 11.

FIG. 12 depicts a user interface 1200 of a preview screen of reordered records 1202-1210 based on the user's movement of the selected record 1108 as depicted in FIG. 11. By dragging and dropping the selected record 1108 (FIG. 11), the selected record 1108 becomes the first record 1208 ahead of the other records 1202-1206 and 1210. The records that used to precede the record 1208, including the records 1202-1206, are repositioned to accommodate the new location of the record 1208. The user may continue to reposition the records 1202-1210 until they are in a desired order for printing or saving. Once the records 1202-1210 are in a desired order, the user may select a print selection option 530 or a print to file option 532 by manipulating the cursor 220 to selection the desired option. Alternatively, the user may select the back to search results or cancel option 534 to return to the selection screen of FIG. 4 to change the records or properties that are selected to be output.

Figure 13:
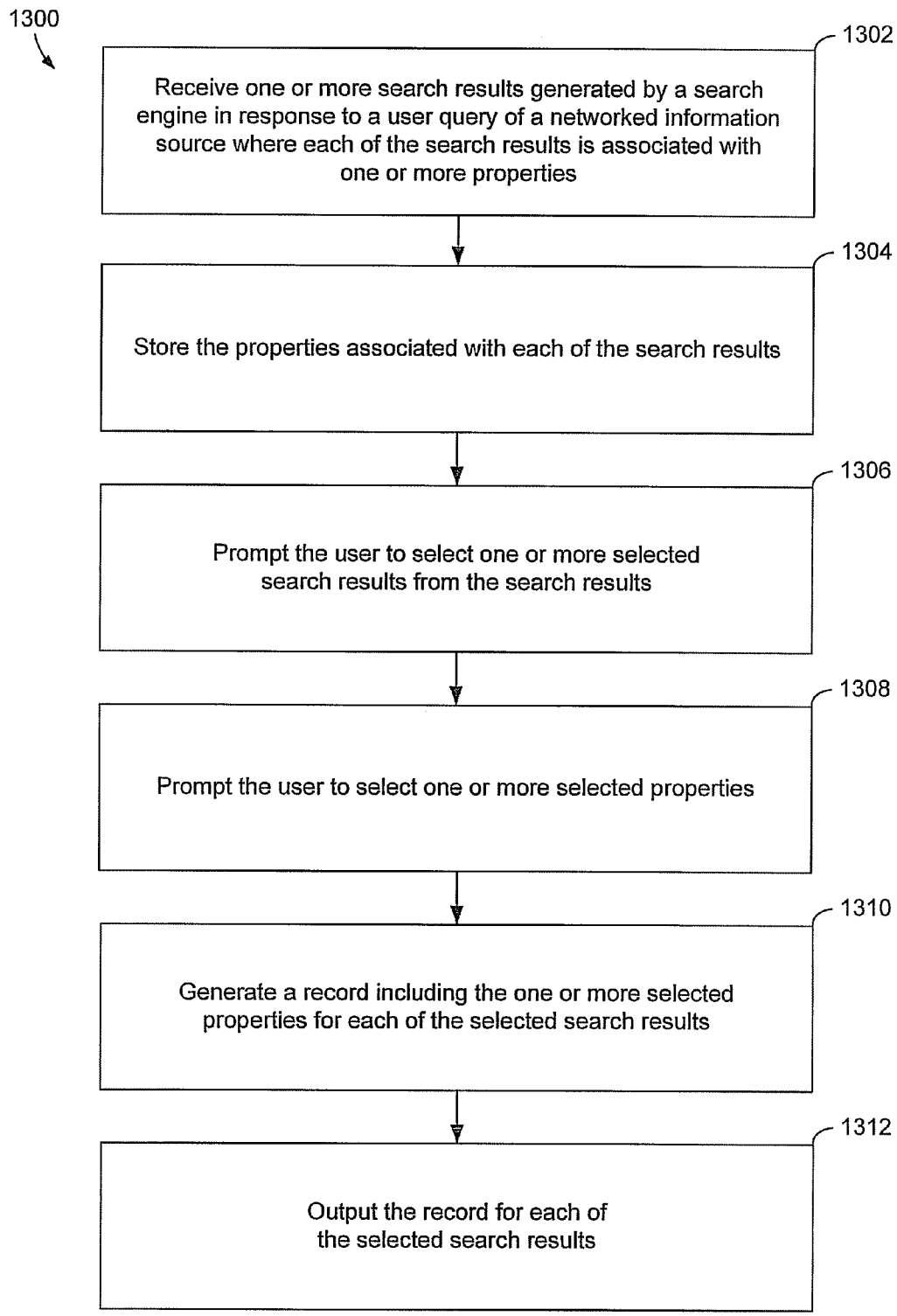
FIG. 13 is a flow diagram of a particular illustrative embodiment of a method of selectively outputting one or more properties of one or more selected search results.

FIG. 13 is a flow diagram 1300 of a particular illustrative embodiment of a method of selectively outputting one or more properties of one or more selected search results. One or more search results generated by a search engine are received in response to a user query of a networked information source where each of the search results is associated with one or more properties, at 1302. The properties associated with each of the search results are stored, at 1304. The user is prompted to select one or more selected search results from the search results, at 1306. The user is prompted to select one or more selected properties, at 1308. A record including the one or more selected properties for each of the selected search results is generated, at 1310. The record for each of the selected search results is output, at 1312.

Figure 14:
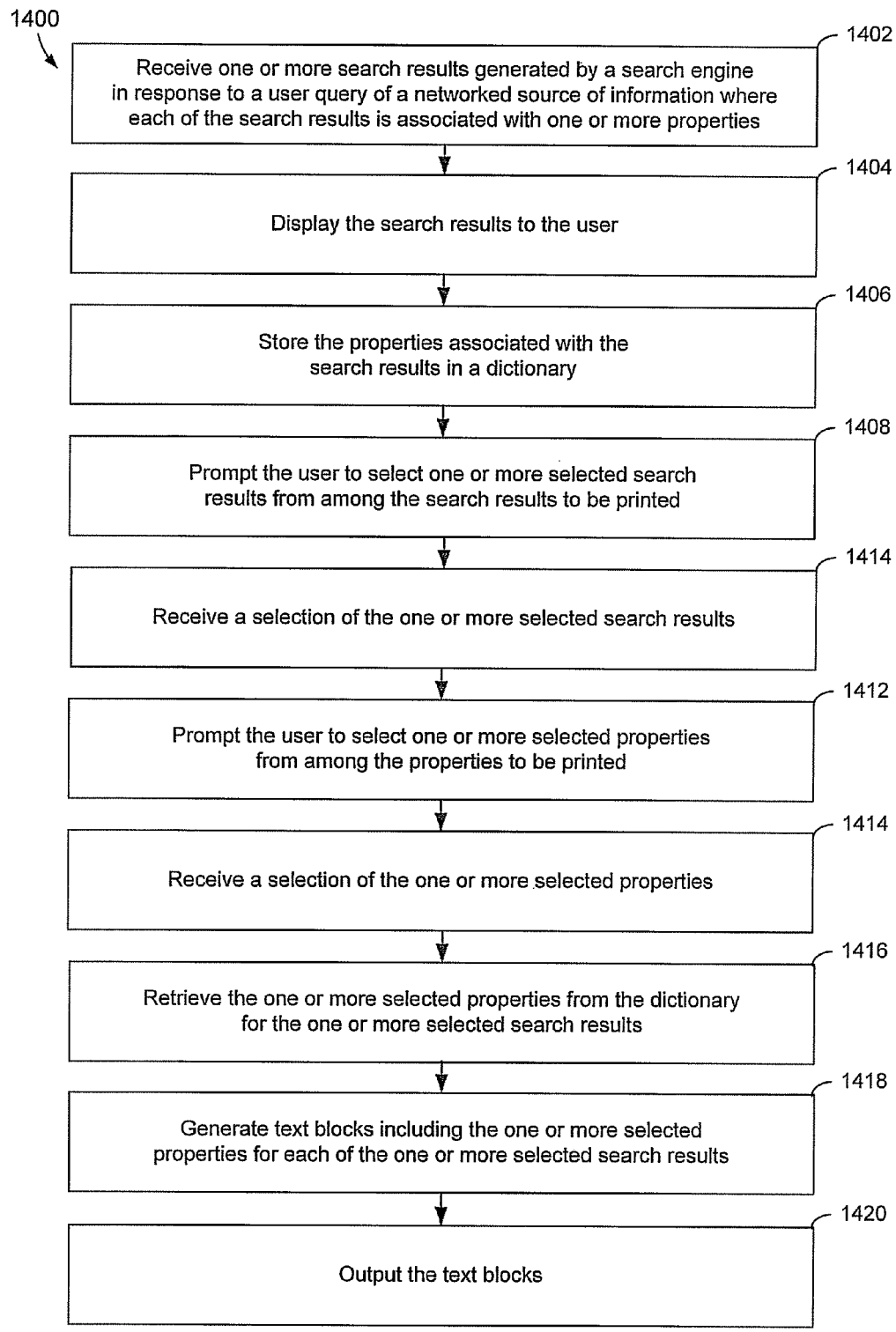
FIG. 14 is a flow diagram of another particular illustrative embodiment of a process manifested in instructions executable by a computing system to selectively output one or more properties of one or more selected search results.

FIG. 14 is a flow diagram 1400 of another particular illustrative embodiment of a process that, for example, may be manifested in instructions executable by a computing system to selectively output one or more properties of one or more selected search results. One or more search results generated by a search engine are received in response to a user query of a networked source of information where each of the search results is associated with one or more properties, at 1402. The search results are displayed to the user, at 1404. The properties associated with the search results are stored in a dictionary, at 1406. The user is prompted to select one or more selected search results from among the search results to be printed, at 1408. A selection of the one or more selected search results is received, at 1410. The user is prompted to select one or more selected properties from among the properties to be printed, at 1412. A selection of the one or more selected properties is received, at 1414. The one or more selected properties for the one or more selected search results are retrieved from the dictionary, at 1416. A list of text blocks including the one or more selected properties for the one or more selected search results is generated, at 1418. The list of text blocks is output, at 1420.

Figure 15:
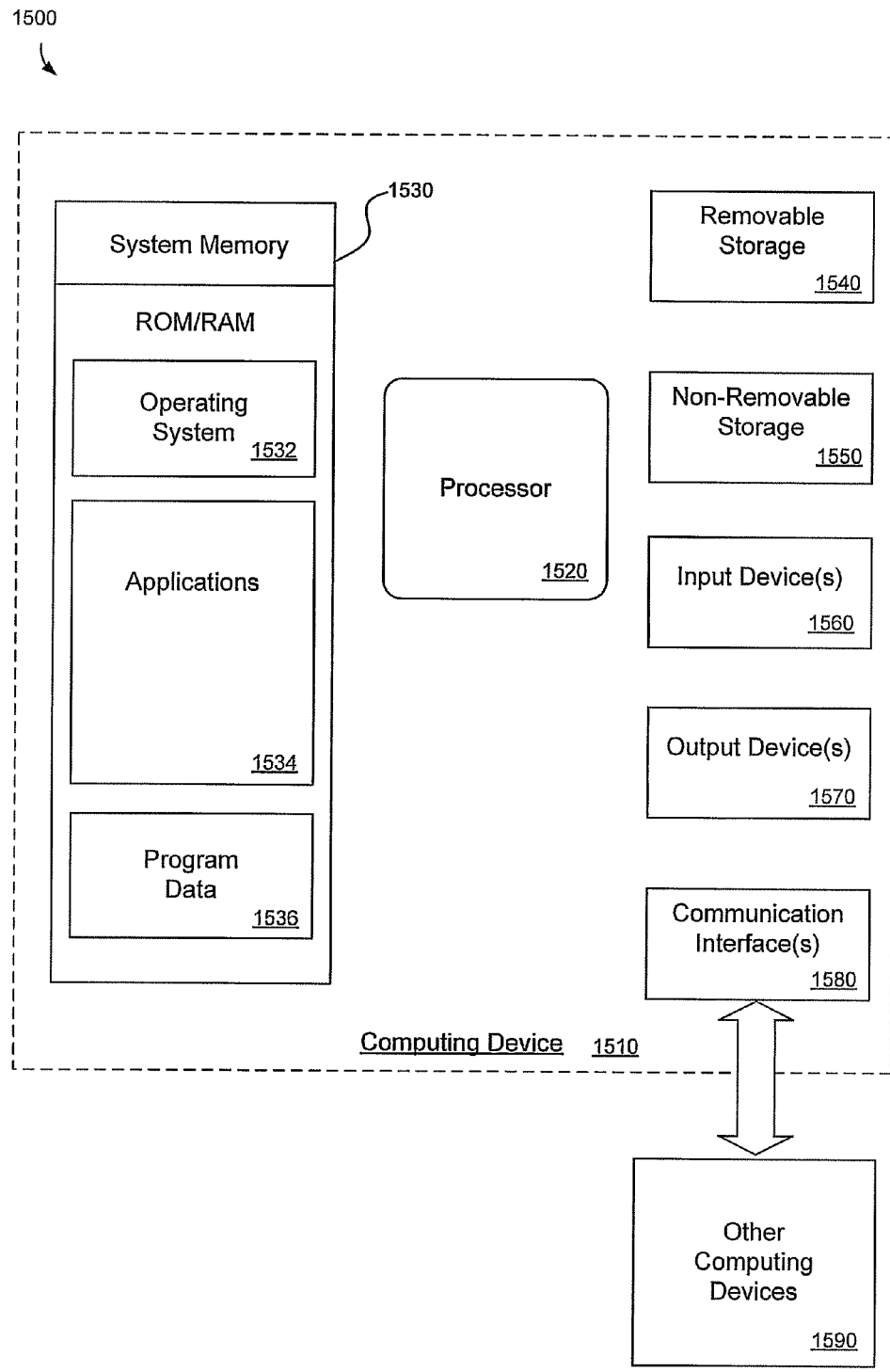
FIG. 15 is a block diagram of a general purpose computer system operable to implement embodiments of computer-implemented methods and computer-executable program instructions such as the instructions of FIGS. 13 and 14.

FIG. 15 is a block diagram 1500 of a general purpose computer system operable to implement embodiments of computer-implemented methods and computer-executable program instructions illustrated by FIGS. 13 and 14. In one illustrative embodiment, a computing device 1510 includes a workstation configured to access networked sources of information over a network in order to submit a query, to view search results, to select search results and properties request, to modify the selections of search results and properties, or cause the results to be printed, saved, or otherwise output. The computing device 1510 typically includes at least one processor 1520. Within the computing device 1510, the processor 1520 communicates with a system memory 1530, one or more storage devices 1540 and 1550, one or more input devices 1560, one or more output devices 1570, and one or more communication interfaces 1580.

The system memory 1530 may include volatile memory devices, such as random access memory (RAM) devices and nonvolatile memory devices such as read-only memory (ROM), programmable read-only memory, and flash memory. The system memory 1530 typically includes an operating system 1532, which may include a basic/input output system for booting the computing device 1510 as well as a full operating system to enable the computing device 1510 to interact with users, other programs, and other devices. The system memory 1530 also typically includes one or more application programs 1534, such as a browser application and, potentially, components of a search results output tool program, as previously described. The system memory 1530 also may include program data 1536, such as a plurality of search results and user selections of search results and properties, as previously described. The processor 1520 also communicates with one or more removable storage devices 1540 and nonremovable storage devices 1550. The removable storage devices 1540 typically include nonvolatile storage devices such as magnetic disks, optical disks, or flash memory devices. The nonremovable storage devices 1550 typically may include one or more of magnetic disks and nonvolatile memory. The storage devices 1540 and 1550 typically are configured to store an operating system, applications, and program data. Results of the search results output tool may be stored on either removable storage 1540 or nonremovable storage 1550.

The processor 1520 communicates with one or more input devices 1560 that enable the computing device 1510 to receive input from a user. The input devices 1560 may include keyboards, pointing devices, microphones, and other devices. The processor 1520 also communicates with one or more output devices 1570 that enable the computing device 1510 to provide output to the user. The output devices 1570 may include one or more displays, speakers, and one or more printers or other hardcopy output devices.

The processor 1520 also communicates with one or more communication interfaces 1580 that enable the computing device 1510 to communicate with other computing devices 1590, such as networked sources of information, such as databases, intranets, or the Internet. The one or more communication interfaces 1580 may include wired Ethernet interfaces, IEEE 802.11 wireless interfaces, Bluetooth communication interfaces, or other network interfaces.

Not all of the components or devices illustrated in FIG. 15 or otherwise described in the previous paragraphs are necessary to support implementations of the present disclosure. For example, a handheld device may include a single system memory 1530 comprised of a flash memory configured to store an operating system, one or more applications, and all program data. A device may or may not include removable storage 1540. In addition, the communication interfaces 1580 may include only a radio transceiver and/or a Universal Serial Bus (USB) connection port for backup, update, and networking functions.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method, comprising:
receiving a plurality of search results generated by a search engine in response to a query of a network information source;
in response to receiving the plurality of search results, storing information that identifies one or more sets of search results, wherein each of the plurality of search results includes information that is associated with one or more properties, wherein each of the one or more identified sets of search results include information that corresponds to one of the one or more properties, and wherein, for each search result in a particular set of search results, the information includes a portion of each search result in the particular set of search results that corresponds to a particular property of the one or more properties; and
displaying at least a portion of the plurality of search results, a first set of selectable elements, and a second set of selectable elements, wherein each selectable element in the first set of selectable elements corresponds to a single search result of the plurality of search results, and wherein each selectable element in the second set of selectable elements corresponds to a particular property of the one or more properties;
receiving selections of two or more selectable elements of the first set of selectable elements to define a subset of search results of the plurality of search results;
receiving a selection of one or more of the second set of selectable elements to identify at least one selected property;
receiving a request to display the subset of search results defined by the selected two or more selectable elements and the at least one selected property; and
displaying at least a portion of information corresponding to each search result in the subset of the search results, wherein the displayed portion of the information corresponding to each search result in the subset of search results corresponds to the at least one selected property, and wherein information corresponding to each search result in the subset of search results that does not correspond to the at least one selected property is not displayed.

2. The method of claim 1, wherein the displayed portion of the information corresponding to each search result in the subset of search results is displayed as two or more text blocks, wherein a particular text block corresponds to a particular search result in the subset of search results, and wherein the particular text block includes the portion of the information corresponding to the particular search result that corresponds to the at least one selected property.

3. The method of claim 2, further comprising moving the particular text block to a different position in relation to another particular text block using a drag and drop operation.

4. The method of claim 1, further comprising outputting the displayed portion of the information corresponding to each search result in the subset of the search results, wherein outputting the information comprises one of sending the displayed portion of the information to a printer and printing the displayed portion of the information to a file.

5. The method of claim 1, wherein the network information source includes one or more selected databases accessible via an intranet.

6. The method of claim 5, wherein the one or more selected databases include one of technical documentation and maintenance information for a plurality of objects.

7. The method of claim 1, wherein the network information source includes an Internet source and wherein at least one search result of the subset of search results is associated with one or more web pages.

8. The method of claim 1, wherein each of the plurality of search results corresponds to a single selectable element in the first set of selectable elements.

9. The method of claim 1, wherein the first set of selectable elements includes a first selectable element and a second selectable element, wherein the first selectable element corresponds to a first search result of the one or more search results, wherein the second selectable element corresponds to a second search result of the one or more search results, and wherein the first search result is different than the second search result.

10. A system comprising:
a processor; and
a memory storing instructions that, when executed by the processor, cause the processor to:
receive a plurality of search results in response to a query of a network information source;
store information that identifies one or more sets of search results in response to receiving the plurality of search results, wherein each of the one or more sets of search results includes one or more search results of the plurality of search results that include information that corresponds to one or more properties, and wherein, for each search result in a particular set of search results, the information includes a portion of each search result in the particular set of search results that corresponds to a particular property of the one or more properties;
display the plurality of search results and a first set of selectable elements at a display via one or more pages, wherein each selectable element in the first set of selectable elements corresponds to a single search result of the plurality of search results;
display a second set of selectable elements at the display via the one or more pages, wherein each of the plurality of search results includes information that is associated with the one or more properties, and wherein the second set of selectable elements correspond to each of the one or more properties;
receive a selection of one or more of the second set of selectable elements to identify at least one selected property;
receive selections of two or more selectable elements of the first set of selectable elements to define a subset of search results of the plurality of search results;
receive a request to display the subset of search results defined by the selected two or more selectable elements and the at least one selected property; and
display at least a portion of information corresponding to each search result in the subset of the search results, wherein the displayed portion of the information corresponding to each search result in the subset of search results corresponds to the at least one selected property, and wherein information corresponding to each search result in the subset of search results that does not correspond to the at least one selected property is not displayed.

11. The system of claim 10, wherein search results of the plurality of search results that are not included in the subset of search results are not displayed in response to receiving the request to display the subset of search results.

12. The system of claim 10, wherein the displayed portion of the information corresponding to each search result in the subset of search results is displayed as two or more text blocks, and wherein a particular text block corresponds to a particular search result in the subset of search results.

13. The system of claim 10, wherein a first selection of the two or more selections corresponds to a first selectable element in the first set of selectable elements, and wherein a second selection of the two or more selections corresponds to a second selectable element in the first set of selectable elements, wherein the first selectable element is displayed via a first page of the one or more pages, and wherein second selectable element in the first set of selectable elements is displayed via a different page of the one or more pages.

14. A computer-readable storage device storing instructions executable by a computing system to:
receive a plurality of search results generated by a search engine in response to a query of a network information source;
store information that identifies one or more sets of search results in response to receiving the plurality of search results, wherein each of the one or more sets of search results includes one or more search results of the plurality of search results that include information that corresponds to one or more properties, and wherein, for each search result in a particular set of search results, the information includes a portion of each search result in the particular set of search results that corresponds to a particular property of the one or more properties;
display at least a portion of the plurality of search results, a first set of selectable elements, and a second set of selectable elements, wherein each selectable element in the first set of selectable elements corresponds to a single search result of the plurality of search results, wherein each of the plurality of search results includes information that is associated with the one or more properties, and wherein the second set of selectable elements correspond to each of the one or more properties;
receive selections of two or more selectable elements of the first set of selectable elements to define a subset of search results of the plurality of search results;
receive a selection of one or more of the second set of selectable elements to identify at least one selected property;
receive a request to display the subset of search results;
display at least a portion of information corresponding to each search result in the subset of the search results, wherein the displayed portion of the information corresponding to each search result in the subset of search results corresponds to the at least one selected property, and wherein information corresponding to each search result in the subset of search results that does not correspond to the at least one selected property is not displayed; and
print the displayed portion of the information corresponding to each search result in the subset of search results that corresponds to the at least one selected property.

15. The computer-readable storage device of claim 14, wherein search results of the plurality of search results that are not included in the subset of search results are not displayed in response to receiving the request to display the subset of search results.

16. The computer-readable storage device of claim 15, wherein the displayed portion of the information corresponding to each search result in the subset of search results is displayed as two or more text blocks, wherein a particular text block corresponds to a particular search result in the subset of search results, wherein the particular text block includes the portion of the information corresponding to the particular search result that is associated with the at least one selected property, and wherein the particular text block does not include information corresponding to the particular search result that is not associated with the at least one selected property.

17. A method comprising:
receiving a plurality of search results generated by a search engine in response to a query of a network information source, wherein each of the plurality of search results includes information that is associated with one or more properties;
in response to receiving the plurality of search results, storing information that identifies one or more sets of search results, wherein each of the one or more sets of search results includes one or more search results of the plurality of search results that include information that corresponds to one of the one or more properties, and wherein, for each search result in a particular set of search results, the information includes a portion of each search result in the particular set of search results that corresponds to a particular property of the one or more properties;
displaying at least a portion of the plurality of search results, a first set of selectable elements, and a second set of selectable elements, wherein each selectable element in the first set of selectable elements corresponds to a single search result of the plurality of search results, and wherein each selectable element in the second set of selectable elements corresponds to one of the one or more properties;
receiving a selection of two or more selectable elements of the first set of selectable elements and at least one of the second set of selectable elements to define a set of search results and at least one selected property;
receiving a request to display the set of search results defined by the selected two or more selectable elements; and
displaying a first portion of the information, wherein the first portion of the information corresponds to the portion of each search result of the set of search results that corresponds to the at least one selected property, wherein the first portion of the information is displayed without accessing the corresponding search result and without performing an additional search of the plurality of search results, wherein a second portion of the information is not displayed, and wherein the second portion of the information corresponds to at least one of search results that are not included in the set of search results defined by the selected two or more selectable elements and portions of the search results included in the set of search results defined by the selected two or more selectable elements that do not correspond to the at least one selected property.

18. The method of claim 17, wherein the first set of selectable elements comprises a first set of checkboxes and wherein the second set of selectable elements comprises a second set of checkboxes.

* * * * *